United States Patent [19]

Siver

[11] 4,351,512

[45] Sep. 28, 1982

[54] VALVE WITH YOKE AND CAPTIVE GLAND WRENCH

[76] Inventor: Chester A. Siver, 10 Fair Hill La., Suffield, Conn. 06078

[21] Appl. No.: 310,146

[22] Filed: Oct. 9, 1981

[51] Int. Cl.³ .................. F16K 41/02; F16J 15/06; F16L 21/04
[52] U.S. Cl. .................................. 251/214; 137/315; 277/107; 277/108; 277/113
[58] Field of Search ................. 137/315; 251/214; 277/107, 108, 113

[56] References Cited

U.S. PATENT DOCUMENTS

| | | | |
|---|---|---|---|
| 590,730 | 9/1897 | Swingle et al. | 277/107 |
| 594,453 | 11/1897 | Wright | 277/107 |
| 788,939 | 5/1905 | Noxon | 277/107 |
| 1,804,581 | 5/1931 | Wigle | 277/107 |
| 1,879,478 | 9/1932 | Pruiett | 277/107 |
| 1,930,982 | 10/1933 | Norris | 277/107 |
| 2,511,109 | 6/1950 | Haskell | 277/108 |
| 2,712,951 | 7/1955 | Legate | 277/107 |
| 3,257,095 | 6/1966 | Siver | 251/214 |
| 4,289,294 | 9/1981 | McLean | 251/214 |

Primary Examiner—George L. Walton

[57] ABSTRACT

A clamp yoke valve has a yoke member engaged with the valve body about its bonnet opening, a bonnet sealing the bonnet opening and including a packing cartridge chamber opening outwardly of the valve body and disposed about the valve stem and a packing gland which is movable axially about the valve stem against the packing in the bonnet member. The packing gland has a multiplicity of teeth about its circumference which are disengageably intermeshed with a multiplicity of teeth in the bore of a gland wrench disposed thereabout. The gland wrench includes a pair of arms extending outwardly of the yoke member to permit rotation thereof and thereby of the packing gland to effect compression of the packing material about the valve stem.

10 Claims, 7 Drawing Figures

VALVE WITH YOKE AND CAPTIVE GLAND WRENCH

BACKGROUND OF THE INVENTION

High pressure globe valves are frequently employed in conduits for high pressure and/or high temperature fluids. A preferred construction for such valves incorporates a clamp yoke over the bonnet extension to facilitate assembly and disassembly, and one such valve which has proven highly effective in service is that illustrated in Siver U.S. Pat. No. 3,257,095.

A problem commonly associated with valves of this type is the necessity for applying a wrench to the packing gland to effect rotation thereof to effect compression of the packing about the valve stem. This may require special wrenches in some instances where the packing gland is especially configured and in all instances requires the operator to carry a wrench. Moreover, in some plants, labor contracts may require a special class of personnel to effect even minimal tightening of the gland.

It is an object of the present invention to provide a novel valve assembly of the yoke type in which there is incorporated a gland wrench to effect the rotation of the gland to compress the packing.

It is also an object to provide such a valve assembly which may be readily fabricated and assembled to provide a durable and highly effective unit which is readily serviced in the field.

Another object is to provide such an assembly in which the gland wrench may be assembled onto the valve assembly and disassembled therefrom in the field.

A further object is to provide such a valve assembly in which the gland wrench also serves to prevent loosening of the packing gland as a result of vibrations occuring during service.

Other objects and advantages will be readily apparent from the following detailed specification and attached drawings.

SUMMARY OF THE INVENTION

It has now been found that the foregoing and related objects may be attained in a valve assembly including a valve body having a bonnet opening therein and a flow passage therethrough. A bonnet is disposed in the bonnet opening of the valve body and has an outwardly facing, axially extending recess therein. Engaged with the valve body about the bonnet opening is a yoke member which extends outwardly from the valve body and which has spaced inner and outer ring portions and a pair of yoke arms extending therebetween. The inner ring portion of the yoke is engaged with the valve body about the bonnet opening.

A valve stem extends through the yoke member and bonnet and into the valve body, and the stem is movable axially relative to the valve body to open and close the flow passage therethrough. A packing gland has an axial passage through which the valve stem extends in a packing portion which extends into the recess in the bonnet, and it is rotatable and slidable axially along the valve stem. The circumference of the packing gland has a multiplicity of axially extending teeth disposed along a portion disposed outwardly of the bonnet. A gland wrench is seated on the packing gland and includes a hub portion with an axially extending bore therethrough and a pair of arms projecting outwardly therefrom. The wall defining the bore through the hub portion includes a portion with axially extending teeth therein which are engagable with the teeth of the packing gland to effect rotation thereof about the valve stem until the arms of the gland wrench abut the yoke arms upon rotation through a limited arc.

The gland wrench is movable axially relative to the packing gland to disengage the teeth therefrom and thereby permit rotation of the gland wrench in the opposite direction and then reengagement of the teeth to effect limited rotation of the packing gland in the first direction through a limited arc. In this manner, the packing gland may be moved inwardly against packing material disposed within the recess of the bonnet to seal the space about the valve stem passing therethrough.

In a preferred embodiment, there is included an elongated bushing member fixedly mounted on the yoke member upper ring portion and extending axially about the valve stem towards the valve body. The valve stem is axially and rotatably received therein, and the bushing has an helically threaded external portion cooperating with an internally helically threaded portion on the gland member to provide controlled axial movement of the gland member therein upon rotation thereof by the gland wrench.

In addition, the assembly desirably includes biasing means biasing the gland wrench axially in one direction to maintain the engagement between the teeth of the gland wrench and the teeth of the packing gland. The gland wrench is movable axially against this biasing pressure to effect disengagement of the teeth to permit rotation of the gland wrench in the opposite direction. Conveniently, this biasing means is a helical compression ring acting between the upper ring portion of the yoke member and the packing gland. The bore of the hub portion has a reduced diameter portion outwardly of the teeth, and this reduced diameter portion provides a radial shoulder which abuts the outer end of the teeth of the packing gland under the biasing pressure of the spring to limit the movement of the wrench under the biasing pressure.

Conveniently, the valve assembly will include a handle asembly at the outer end of the stem and, in accordance with a preferred aspect of the present invention, is comprised of a handle adapter secured on the stem and a handle with a cooperatively configured and dimensioned shoulder which permits some relative rotational movement to provide impact action upon the handle adapter and thereby firmly seat the valve disc in the valve seat.

In accordance with one embodiment of the present invention, the gland wrench is integrally formed and captive within the clamp yoke member until disassembly of the valve assembly from the valve body. In another embodiment, the gland wrench is comprised of a cooperating pair of members each of which provides a segment of the hub portion and an arm portion, and disengageable fastener means which effect assembly of the cooperating members about the gland member. In this manner, installation of the gland wrench may be made upon a valve assembly while it is in service.

It will be appreciated that the valve assembly will include conventional packing material or rings in the chamber of the bonnet and which is subjected to substantial axial compressive pressure by the packing gland upon rotation of the gland wrench.

DETAILED DESCRIPTION OF THE ILLUSTRATED EMBODIMENTS

Figure 1:
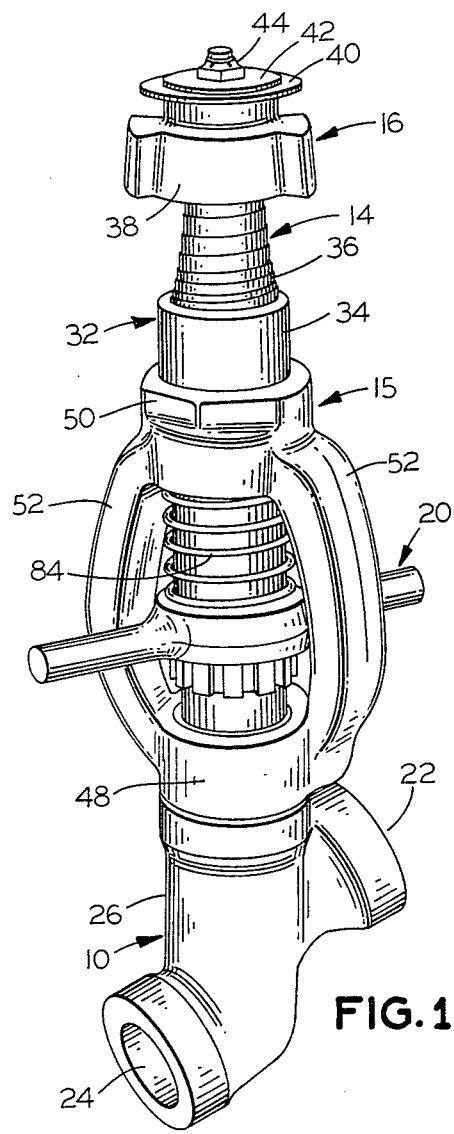
FIG. 1 is a perspective view of a clamp yoke valve assembly employing a gland wrench in accordance with the present invention.

Turning first to FIG. 1, therein illustrated is a valve embodying the present invention and comprised of the valve body generally designated by the numeral 10, the bonnet generally designated by the numeral 12, the valve stem assembly generally designated by the numeral 14, the clamp yoke generally designated by numeral 15, the handle adapter assembly generally designated by the numeral 16, the packing gland generally designated by the numeral 18, and the gland wrench generally designated by the numeral 20.

Turning in detail first to the valve body 10, it has spaced ports 22, 24 through which fluid enters and exits, and a bonnet extension 26 which is externally threaded.

The valve stem assembly 14 includes the valve stem 28 which extends through the bore 30 in the bonnet extension 26 and which carries at its inner end the valve disc (not shown) which cooperates with the valve seat (not shown) to close the flow passage (not shown) between the ports 22, 24 of the valve body 10. A protective shroud generally designated by the numeral 32 is provided about the stem 28 above the yoke 15 and includes a generally annular body portion 34 disposed against the upper surface of the bonnet 12 and a collapsible, helically coiled spring portion 36 extending upwardly therefrom to encapsulate the stem 28 from the bonnet 12 to the handle assembly 16.

At the outer or upper end of the stem 28 is the handle adapter assembly 16 including the adapter 38 with its opposing arms to engage with the cooperatively configured operating handle (not shown), the annular identification plate 40, the washer 42 and the nut 44 which is threadably engaged on the reduced diameter end portion of the stem 28. The outer end of the stem 28 has a tapered portion 46 of rectangular cross section on which is seated the adapter 38 which has a central aperture of complementary tapering rectangular configuration to prevent relative rotation therebetween.

Figure 2:
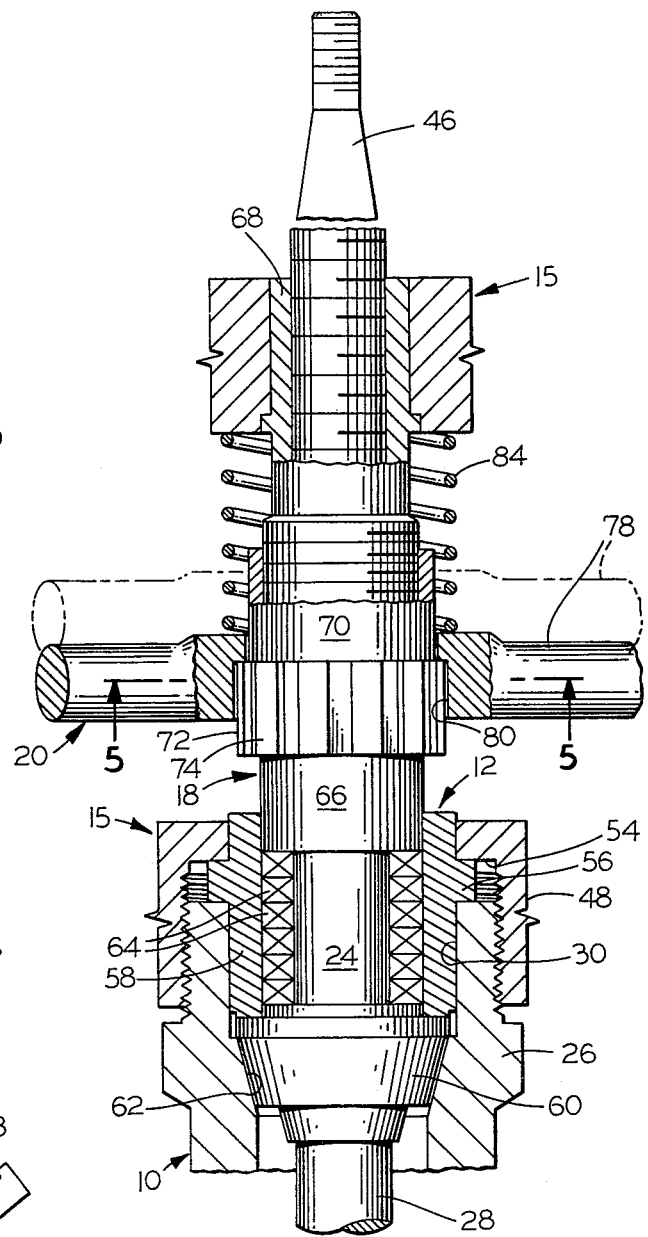
FIG. 2 is a fragmentary vertical section thereof drawn to an enlarged scale from that of FIG. 1, with the handle adapter assembly and shroud removed therefrom and with the gland wrench shown in phantom line in an elevated, disengaged position.
Figure 3:
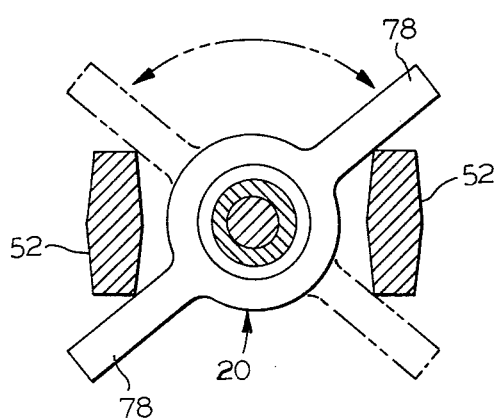
FIG. 3 is a partially diagrammatic transverse sectional view of the yoke arms, bushing, valve stem, packing gland and gland wrench drawn to a reduced scale from that of FIG. 2 and showing the gland wrench in phantom line in a rotated position.
Figure 4:
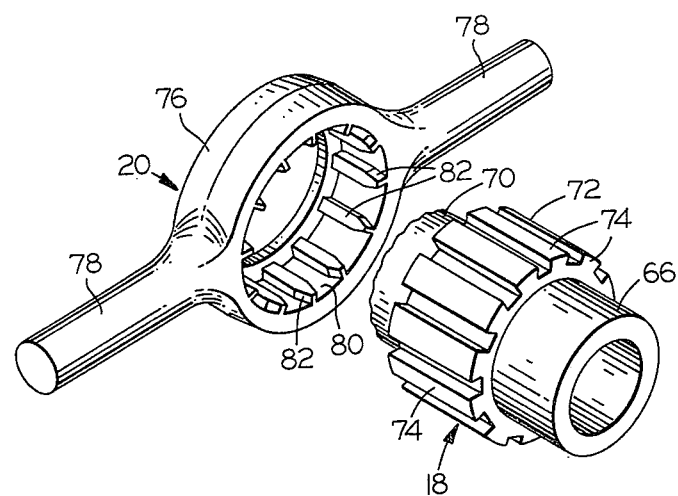
FIG. 4 is an exploded perspective view of the packing gland and gland wrench.
Figure 5:
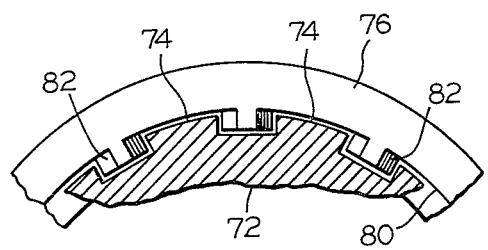
FIG. 5 is a fragmentary sectional view along the line 5—5 of FIG. 2 and drawn to an enlarged scale.

The yoke 15 has a lower split ring portion 48 and an upper ring portion 50 which are joined by a pair of yoke arms 52. As best seen in FIG. 2, the split ring portion 48 is internally threaded and in threaded engagement with the externally threaded bonnet extension 26. A clamp bolt (not seen) clamps the split ring portion 48 firmly on the valve body 10.

The split ring portion 48 includes an annular shoulder 54 which abuts the peripheral collar 56 of the packing cartridge chamber portion 58 of the bonnet 12. The chamber portion 58 extends downwardly into the bore 30 of the bonnet extension 36 and is welded at its lower end to the bonnet portion 60 which has a frustoconical circumferential surface cooperating with a shoulder 62 of complimentary configuration on the bonnet extension 26 to provide a seal between the bonnet 12 and valve body 10.

Disposed within the cylindrical chamber of the chamber portion 58 is a series of annular packing rings 64 through which the valve stem 28 extends. The packing gland 18 has an annular lower end portion 66 which is dimensioned to fit snugly within the chamber of the chamber portion 58 of the bonnet 12 which bears against the upper surface of the uppermost packing ring 64.

An elongated bushing 68 is seated at its upper end in the upper ring 50 of the yoke 15 and extends along the stem 28 into the upwardly opening cylindrical bore in the annular upper portion 70 of the packing gland 18. At its lower end the bushing 68 is externally threaded, and the bore in the upper portion 70 of the packing gland 18 is internally threaded to provide threaded engagement therewith so that rotation of the packing gland 18 about the bushing 68 will effect movement of the gland 18 along the bushing 68 to apply pressure to the packing rings 64 in the chamber portion 58.

The intermediate portion 72 of the packing gland 18 is of greater diameter than the end portions 66, 70 and is provided with a multiplicity of axially extending splines or teeth 74. The gland wrench 20 has a generally annular hub portion 76 and diametrically spaced arms 78 which project outwardly of the yoke arms 52. The hub portion 76 has an enlarged counterbore 80 in its lower surface and which has axially extending splines or teeth 82 cooperating with the splines 74 of the packing gland 18 to effect driving engagement therebetween to effect rotation of the packing gland 18 about the bushing 68. When the wrench arms 78 abut the yoke arms 52, the wrench 20 may be moved upwardly on the gland 18 to disengage the splines and then may be rotated in the reverse direction. The compression spring 84 biases the gland wrench 20 downwardly to ensure firm seating of the gland wrench 20 on the packing gland 18.

Figure 6:
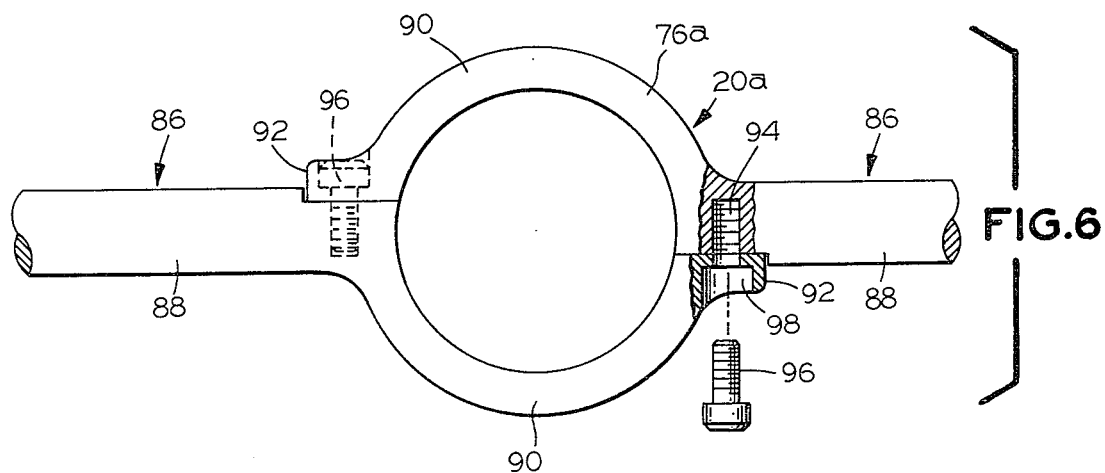
FIG. 6 is a fragmentary plan view of a readily disassemblable embodiment of gland wrench with a portion in partial section and with one of the assembly fasteners removed for purposes of clarity of illustration.
Figure 7:
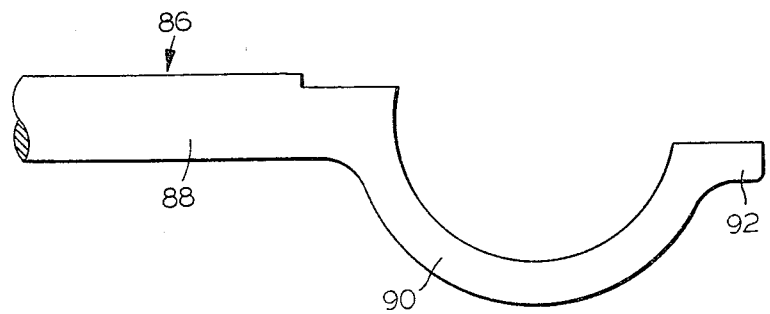
FIG. 7 is a similar fragmentary plan view of only one element of the gland wrench embodiment of FIG. 6.

In the embodiment illustrated in FIGS. 6 and 7, the gland wrench 20a is comprised of two sections generally designated by the numeral 86 and each comprising an arm portion 88 and a generally semicircular portion 90 with a boss 92 at the end thereof opposite the arm portion 88. Each arm portion 88 has a threaded bore 94 therein adjacent the semicircular portion 90 which threadably engages the fastener 96 seated in the opposed aperture 98 of the boss 92 of the other section 86 to effect assembly of the wrench 20a. The semicircular portions 90 when assembled define a hub portion 76a similar to that of the wrench 20 of the embodiment of FIGS. 1-5, and its splines 82a similarly engage the splines 74 of the packing gland 18 to effect rotation thereof.

Turning now to the operational aspects of the valve assembly of the present invention, the gland wrench 20 is assembled onto the packing gland 18 at the time of assembly of the valve or at a time when the clamp yoke member 15 is removed from the valve body 10. More particularly, before the valve stem 28 has been located in the valve body 10, substantially the complete valve superstructure may be assembled as a subassembly with the bonnet 12 being loosely disposed on the valve stem 28 and with the packing cartridges or rings 64 being located in the chamber portion 58.

In making this subassembly, the gland 18 is threaded onto the bushing 68 in loose assembly with the gland wrench 20 and compression spring 84. The valve stem 28 is then inserted into the bonnet 12 which contains the packing rings 64, and this subassembly is threaded into the bushing 68 to produce the valve superstructure subassembly. This subassembly is then moved into registry with the bonnet extension 26 and the stem 28 and bonnet 12 are moved into the bonnet opening of the valve body 10. The bonnet 12 is moved axially on the valve stem 28 until fully seated in the valve body opening of the bonnet extension 26. The clamp yoke member 15 is moved downwardly to locate the lower split ring portion 48 about the bonnet extension 26, and its collar 54 locks the shoulder 56 of the bonnet 12 against the valve body. After this has been done, the clamp fastener (not shown) is tightened to clamp the split ring portion 48 firmly onto the valve body 10. Simultaneously, this movement compresses the spring 84 and biasing the gland wrench 20 into engagement with the packing gland 18.

The gland wrench 20 may now be rotated with its teeth 82 engaging the teeth 74 of the packing gland 18 to effect rotation of the packing gland 18 on the bushing 68. By reason of the threaded engagement of the packing gland 18 on the bushing 68, this effects movement of the lower end of the packing gland 18 into the bonnet 12 to compress the packing rings 64 tightly about the valve stem 28 and effect sealing engagement therewith. As will be appreciated, rotation of the gland wrench 20 may be effected through only a limited arc since its arms 78 will abut the yoke arms 52. The gland wrench 20 may then be moved axially upwardly against the biasing pressure of the spring 84, rotated in the opposite direction until its arms 78 abut the yoke arms 52, and then allowed to move downwardly into engagement with the teeth 74 of the packing gland 18. If necessary, the gland wrench 20 may be rotated in this manner as many times as necessary to effect the degree of compression of the packing rings 64.

To ensure against any possibility that the gland 18 will unscrew on the bushing 68 as a result of vibrations while the valve is in service, the gland wrench 20 is left in a counterrotated position with its arms 78 abutting the yoke arms 52 and the spring 84 will maintain the gland 18 and wrench 20 in assembly to prevent any rotation of the gland 18.

As will be appreciated, this procedure for assembling the gland wrench 20 may be effected only when the valve is not in service. However, the gland wrench embodiment illustrated in FIGS. 6 and 7 may be utilized to permit assembly and disassembly with the valve in service. In this instance the two segments 86 of the wrench 20a are assembled about the packing gland 18 and then secured in position by inserting and tightening the fasteners 92.

If so desired, the compression spring 84 may be omitted but it has been found to provide positive engagement between the two members during rotation. Other variations in the construction and configuration of the various members may also be effected.

Thus, it can be seen from the foregoing detailed specification and attached drawings that the valve assembly of the present invention affords significant advantages in that it may have assembled thereto at all time during operation of the valve the gland wrench necessary to effect rotation of the packing gland and thereby the compression of the packing rings about the valve stem. The combination of the axially disengageable wrench and gland accommodates the limitation of movement of the wrench between the yoke arms. Moreover, the gland wrench may also function to prevent any untightening of the gland as a result of vibrations in service.

Having thus described the invention, I claim:

1. In a valve assembly, the combination comprising:
   A. a valve body having a bonnet opening therein and a flow passage therethrough;
   B. a bonnet in said bonnet opening and having an outwardly facing axially extending recess therein;
   C. a yoke member engaged with said valve body and extending outwardly therefrom, said yoke member having spaced inner and outer ring portions and a pair of yoke arms extending therebetween, said yoke inner ring portion being engaged with said valve body about said bonnet opening;
   D. a valve stem extending through said yoke member and bonnet and into said valve body, said valve stem being movable axially relative thereto to open and close said flow passage through said valve body;
   E. a packing gland having an axial passage through which said valve stem extends and a packing portion extending into said recess in said bonnet, said packing gland being rotatable and slidable axially along said valve stem and having a multiplicity of axially extending teeth about the circumference thereof along a portion thereof disposed outwardly of said bonnet; and
   F. a gland wrench including a hub portion with an axially extending bore therethrough and a pair of arms projecting outwardly therefrom, the wall defining said bore including a portion with axially extending teeth thereon engageable with the teeth of said packing gland to effect rotation thereof about said valve stem, the arms of said gland wrench abutting said yoke arms upon rotation through a limited arc in a first direction, said gland wrench being movable axially relative to said packing gland to disengage the teeth thereof and thereby permit rotation of said gland wrench in the opposite direction and then reengagement of the teeth thereof to effect limited rotation of the packing gland in the first direction through a limited arc, whereby the packing gland may be moved inwardly against packing material disposed within said recess of said bonnet to seal any space about said valve stem passing therethrough.

2. The valve assembly in accordance with claim 1 wherein said combination includes an elongated bushing member fixedly mounted on said yoke member upper ring portion and extending axially about said valve stem towards said valve body, said valve stem being axially and rotatably received therein, said bushing having a helically threaded external portion cooperating with an internally helically threaded portion on said gland member to provide controlled axial movement of said gland member thereon upon rotation thereof by said gland wrench.

3. The valve assembly in accordance with claim 1 wherein said assembly includes biasing means biasing said gland wrench axially in one direction to maintain engagement of the teeth of said gland wrench and packing gland, said gland wrench being movable axially in the other direction against said biasing pressure to effect disengagement of the teeth to permit rotation of said gland wrench in said opposite direction.

4. The valve assembly in accordance with claim 3 wherein said biasing means is a helical compression spring acting between said yoke member upper ring portion and said packing gland.

5. The valve assembly in accordance with claim 3 wherein said hub portion bore has a reduced diameter portion outwardly of said teeth providing a radial shoulder which abuts the outer end of said packing gland teeth under the biasing pressure of said biasing means to limit movement under the biasing pressure.

6. The valve assembly in accordance with claim 1 wherein said combination includes an elongated bushing member fixedly mounted on said yoke member upper ring portion and extending axially about said valve stem towards said valve body, said valve stem being axially and rotatably received therein, said bushing having a helically threaded external portion cooperating with an internally helically threaded portion on said gland member to provide controlled axial movement of said gland thereon upon rotation thereof by said gland wrench and wherein said assembly includes biasing means biasing said gland wrench axially in one direction to maintain engagement of the teeth of said gland wrench and packing gland, said gland wrench being manually movable axially in the other direction against said biasing pressure to effect disengagement thereof and wherein said biasing means is a helical compression spring acting between said yoke upper ring portion and said packing gland.

7. The valve assembly in accordance with claim 1 wherein said combination includes a handle assembly at the outer end of said valve stem.

8. The valve assembly in accordance with claim 1 wherein said gland wrench is integrally formed and captive within said yoke member until disassembly of the valve assembly.

9. The valve assembly in accordance with claim 1 wherein said gland wrench is comprised of a cooperating pair of members each providing a segment of said hub portion and an arm portion, and disengageable fastener means to effect assembly of said members about said gland member, whereby installation thereof may be made upon a valve assembly in service.

10. The valve assembly in accordance with claim 1 wherein said combination includes packing material in said bonnet recess about said valve stem and said packing gland applies substantial axial compressive pressure thereto.

* * * * *

UNITED STATES PATENT AND TRADEMARK OFFICE
CERTIFICATE OF CORRECTION

PATENT NO. : 4,351,512
DATED : September 28, 1982
INVENTOR(S) : Chester A. Siver It is certified that error appears in the above-identified patent and that said Letters Patent are hereby corrected as shown below:

Column 7, line 30, after "gland" insert -- member --

Signed and Sealed this

First Day of March 1983

[SEAL]

Attest:

GERALD J. MOSSINGHOFF

Attesting Officer     Commissioner of Patents and Trademarks